United States Patent [19]

Saaski et al.

[11] 4,307,607

[45] Dec. 29, 1981

[54] TEMPERATURE SENSING ARRANGEMENT AND METHOD

[75] Inventors: Elric W. Saaski, Pasco; Richmond J. Hoch; Richard L. Skaugset, both of Kennewick, all of Wash.

[73] Assignee: Electric Power Research Institute, Inc., Palo Alto, Calif.

[21] Appl. No.: 57,904

[22] Filed: Jul. 16, 1979

[51] Int. Cl.³ .................... G01K 11/14; G01K 11/18
[52] U.S. Cl. ........................................ 73/356; 73/350
[58] Field of Search .................. 73/350, 356, 339 R; 250/231 R; 350/354

[56] References Cited

U.S. PATENT DOCUMENTS

| | | | |
|---|---|---|---|
| 2,666,583 | 1/1954 | Whitney | 73/356 |
| 3,252,374 | 5/1966 | Stookey | 350/354 |
| 3,513,704 | 5/1970 | Watcher | 73/355 |
| 3,591,810 | 7/1971 | Jackson | 73/356 |
| 3,672,221 | 6/1972 | Weil | 73/339 R |
| 3,960,017 | 6/1976 | Romanowski | 73/350 |
| 4,111,050 | 9/1978 | Waddoups | 73/356 |
| 4,136,566 | 1/1979 | Christensen | 73/356 |
| 4,179,927 | 12/1979 | Saaski | 73/350 |

Primary Examiner—James J. Gill
Assistant Examiner—Denis E. Corr
Attorney, Agent, or Firm—Flehr, Hohbach, Test, Albritton & Herbert

[57] ABSTRACT

An arrangement for sensing temperature changes at an object, specifically within a transformer or the like, is disclosed herein. In one embodiment, this arrangement utilizes as one of its main components a sensor including a solid glass medium which changes in optical density with changes in temperature, a single optical fiber for directing a beam of light into the glass media, a single optical fiber for collecting the light transmitted through the medium, and an optical means for imaging the transmitted light to the collecting fiber. In addition, in this embodiment, the light is caused to pass through the glass medium such that the amount of light reaching the collecting fiber is linearly dependent upon the temperature at the medium with respect to temperatures within a wide range.

9 Claims, 8 Drawing Figures

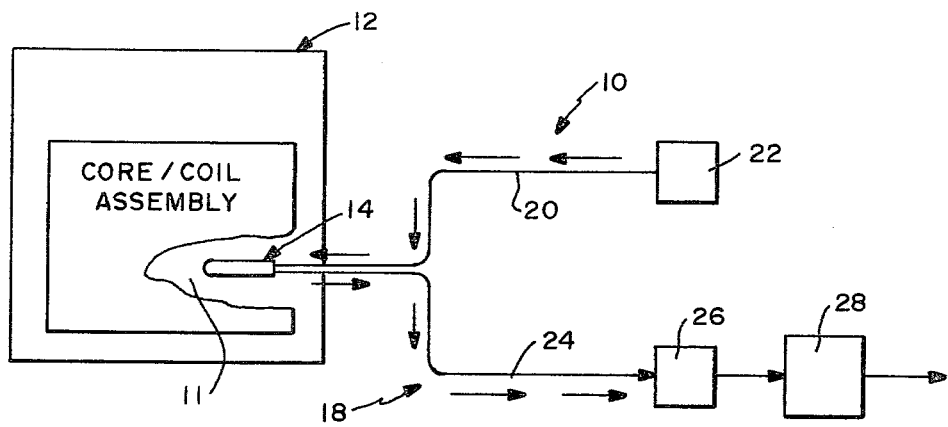
FIG.—1
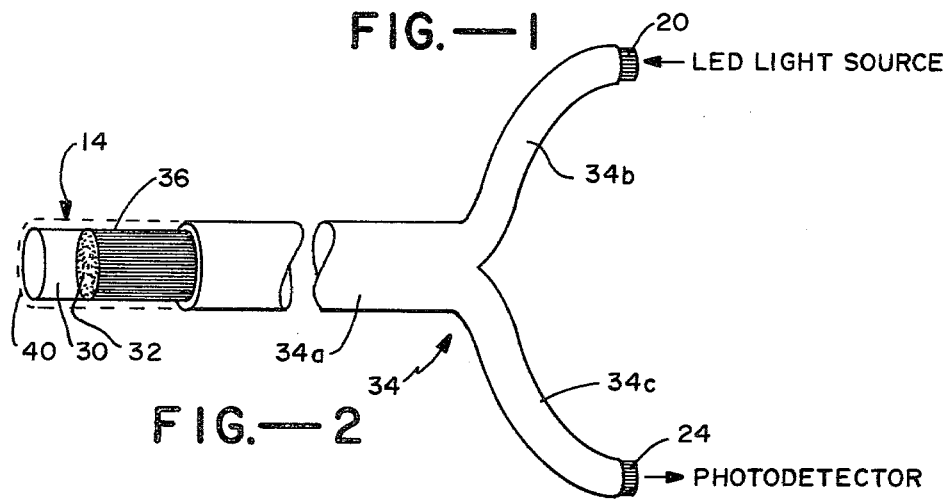
FIG.—2
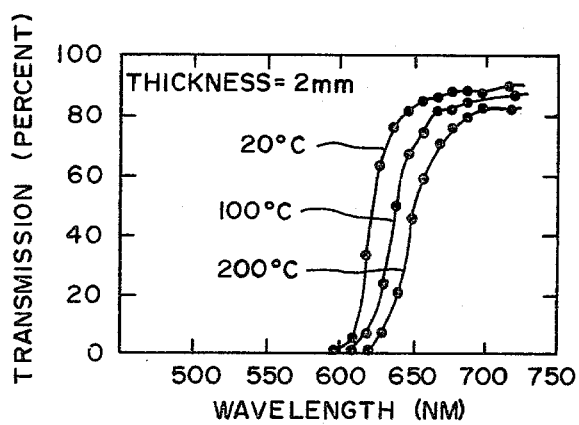
SEPECTRAL TRANSMISSION OF A SELENIUM RUBY GLASS AS A FUNCTION OF TEMPERATURE
FIG.—3A

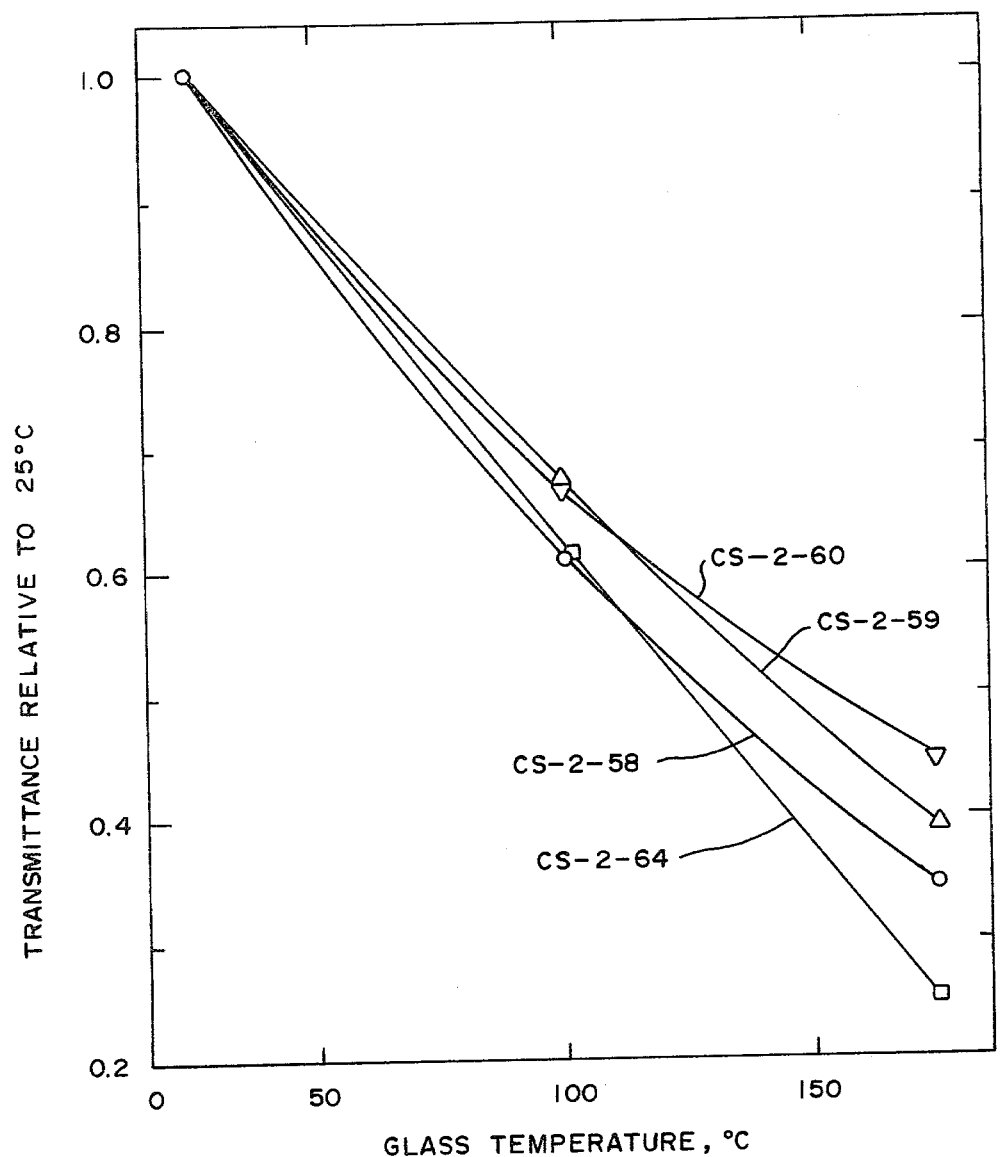
| CS NO. | 37% TRANS WAVELENGTH NM | THICKNESS mm | LED PEAK WAVELENGTH NM | LED OUTPUT μW |
|---|---|---|---|---|
| 2-64 | 664 | 3.0 | 665 | 320 |
| 2-58 | 643 | 3.0 | 635 | 138 |
| 2-59 | 630 | 3.4 | 635 | 138 |
| 2-60 | 622 | 3.4 | 538 | 24 |
FIG.—3B

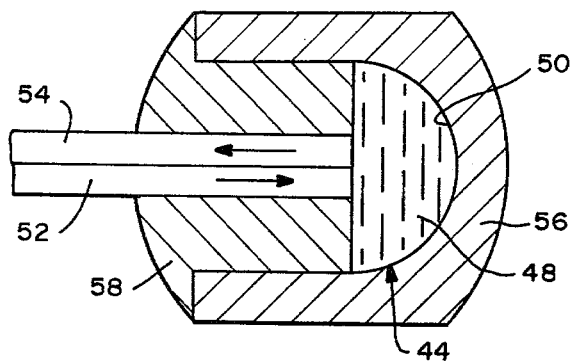
FIG.—4
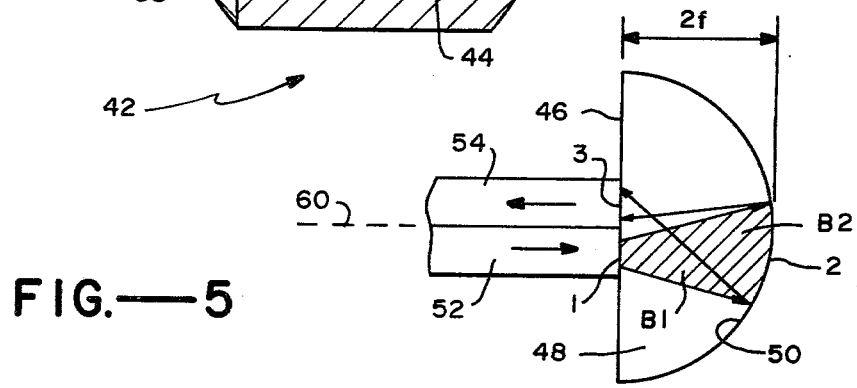
FIG.—5
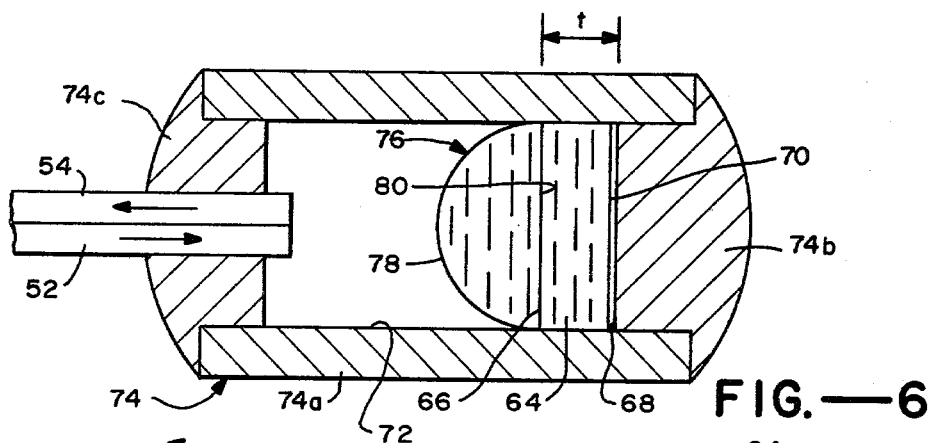
FIG.—6
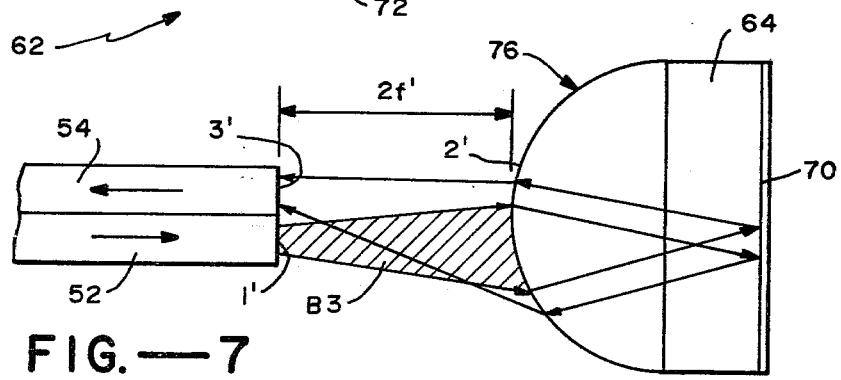
FIG.—7

TEMPERATURE SENSING ARRANGEMENT AND METHOD

The present invention relates generally to an arrangement for sensing changes in temperature at a given point such as the arrangement disclosed in U.S. patent application, Ser. No. 837,451, filed Sept. 28, 1977 and assigned to the Assignee of the present application now U.S. Pat. No. 4,179,927. The present invention relates particularly to an improved sensor for use in this type of general arrangement.

As stated in the above recited application, it has not been common practice heretofore to monitor the temperature at a particular point within an operating transformer by direct measurement, that is, by sensing the temperature directly at or within close proximity to the coils and/or core of the transformer. This has primarily been due to the fact that most monitoring devices utilized in the past included metal sensor and/or wires and that such sensors and/or wires located within the transformer could adversely affect the electrical field distribution therein. This, in turn, could possibly lead to arcing and transformer failure. In order to avoid this type of problem, calculational schemes involving the top oil temperature of the transformer as a parameter have generally been employed to compute the temperature rise within its core and coils. Experimental verification of this method has not been generally possible and hence it is not known whether this type of indirect measurement adequately reflects the temperature at the desired points within the transformer. Nevertheless, there is a definite need for measuring directly the temperatures in transformers, especially large transformers, and particularly in the zones of highest temperature which are typically at high potential and/or inaccessible. Therefore, there is also a need for a sensor system which is non-conducting, flexible, utilizes remote-reading, and capable of measuring temperatures up to about 200° C. One arrangement which has been suggested to meet these requirements is described in the above recited patent application and utilizes nitrogen dioxide gas as its temperature sensing media. Other materials including a particular type of glass (utilized in accordance with the present invention) are discussed in a paper incorporated herein by reference and entitled "An Optical Temperature Sensor For High Voltage Applications" presented by E. W. Saaski and R. L. Skaugset at the IEEE/PES Exposition on overhead and underground T and D, Apr. 3, 1979, Atlanta, Georgia. In this paper the use of nitrogen dioxide is discussed along with semiconductor materials such as GaAs and CdS, phosphors and glass.

As will be seen hereinafter, the arrangement disclosed herein is similar to the arrangement disclosed in the above recited patent application Ser. No. 837,451 to the extent that it provides direct temperature sensing capabilities within the transformer or the like using an electrically non-conductive sensor including sensing media which exhibits temperature-dependent optical properties. However, as will be seen hereinafter, in accordance with one aspect of the present invention, the arrangement disclosed herein utilizes a sensor having particular optical properties in order to improve its sensitivity and, in accordance with another aspect, it is designed to provide a linear output, that is, the light transmitted through its temperature-dependent medium is linearly proportionate to the temperature at the medium.

In view of the foregoing, one object of the present invention is to provide an uncomplicated and yet reliable sensor for use in a temperature sensing arrangement of the general type described above and specifically a sensor utilizing a sensing medium which exhibits temperature-dependent optical properties, means for directing a beam of light through this medium and a means for collecting the light transmitted therethrough.

Another object of the present invention is to provide a sensor including its own efficient optical system for reducing the amount of otherwise transmitted light which is lost through dispersion as it passes through the sensing medium.

Still another object of the present invention is to provide a sensor having an optical system which cooperates with its sensing medium and the light passing therethrough such that single optical fibers can be used as the light directing and collecting means.

A further object of the present invention is to provide a sensor utilizing a thermo-optical sensing medium of solid glass which is designed to provide an output (of transmitted light) that is linearly dependent upon the temperature at the medium with respect to temperatures within a wide range, for example from temperatures as low as −30° C. to 200° C.

As will be seen hereinafter, the temperature sensing arrangement disclosed herein utilizes a sensor including a thermo-optical medium which, with respect to light within a given wavelength band, changes in optical density with changes in temperature within a given temperature range for changing the amount of light which can be transmitted therethrough. The arrangement also includes means cooperating with a light source operating in the particular wavelength band for directing an outwardly expanding beam of light (e.g. a cone of light) from the source into the medium for passage therethrough and means for detecting the light actually transmitted therethrough.

In accordance with one aspect of the present invention, the light passing through the sensing medium is directed from a first point to a second point along a first path, at least a segment of which passes through the medium. At this second point, the transmitted light is imaged by suitable means towards a third point along a second path. The light reaching this third point is detected and ultimately used to indicate the temperature at the sensing medium. In a preferred embodiment, a single optical fiber is used to direct the light beam from the first point to the second point and a single optical fiber is utilized to collect the light which is transmitted to the third point.

In accordance with a second aspect of the present invention, the sensing medium referred to above is comprised of a solid glass material having the necessary thermo-optical properties and designed to cooperate with the light passing therethrough such that the amount of light which is actually transmitted therethrough is linearly dependent upon the temperature of the medium with respect to temperatures within a wide range, for example from 20° C. (or as low as −30° C.) to 200° C.

FIG. 1 is a block diagram of an object, specifically an operating transformer, and an arrangement constructed in accordance with the present invention provided for sensing temperature changes at the object, particularly within the core/coil assembly of the transformer.

FIG. 2 is an enlarged perspective view of a sensor and certain associated components designed in accordance with one embodiment of the present invention and comprising part of the overall temperature sensing arrangement illustrated in FIG. 1.

FIG. 3a is a graphic illustration of the transmission versus wavelength properties for a particular thermoptical soli d glass sensing medium at different temperatures.

FIG. 3b is a graphic illustration of the way in which a number of different sensors of the general type shown in FIG. 2 operate in the arrangement of FIG. 1.

FIG. 4 is a view in longitudinal section of a sensor designed in accordance with a second embodiment of the present invention.

FIG. 5 is a diagrammatic illustration of the way in which the sensor of FIG. 4 operates from an optical standpoint.

FIG. 6 is a view in longitudinal section of a sensor designed in accordance with still another embodiment.

FIG. 7 is a diagrammatic illustration of the way in which the sensor of FIG. 6 operates from an optical standpoint.

Turning to the drawings, wherein like components are designated by like reference numerals throughout the various figures, an arrangement 10 which is constructed in accordance with the present invention and which is provided for sensing temperature changes at a predetermined point 11 in an object 12 or for generally monitoring the temperature at point 11 is illustrated in FIG. 1. As will be described in more detail hereinafter this arrangement utilizes a sensor 14 including a temperature responsive substance which changes optical density with changes in temperature. The sensor is located at the desired point of measurement in or at object 12 which, in the embodiment illustrated, is an operating transformer and the sensor is located at a predetermined point in its core/coil assembly.

As will be seen below, a change in temperature at point 11 (within a predetermined range) causes the optical density of the temperature responsive means to change with respect to light within a given bandwidth range, thereby changing its light absorption capability. Hence, in order to monitor changes in temperature at point 11, device 10 monitors this change in optical absorption. This is accomplished by means of a detecting arrangement 18 which first directs a predetermined amount of light into the temperature responsive substance and then determines how much of this light is transmitted through the substance, that is, not absorbed, thereby indicating the optical density of the substance and therefore, by means of comparison, a change in temperature at point 11.

As seen in FIG. 1, light is directed into sensor 14, that is, into its sensing media by means of a fiber optics bundle 20 coupled at one end to a suitable light source 22, for example a light emitting diode or incandescent lamp which is powered by conventional means and which provides light within a particular wavelength band. Light transmitted through sensor 14 is collected at one end of a second fiber optics bundle 24 which has its other end connected to suitable electrical circuitry 36 including, for example, a phototransistor, photodiode or the like for converting the collected light to a corresponding electrical signal. This signal corresponds to the temperature at sensor 14 and may be appropriately treated by conventional circuitry generally indicated at 28 in the manner described in the above recited patent application. In fact, with the exception of the particular type of sensor used and the means for directing the light into and carrying it out of the sensor, arrangement 10 thus far described may operate in the manner described in the last-mentioned patent application. However, as will be seen hereinafter, because of the present sensor there are a number of advantages to the present arrangement. First, the sensor itself in a preferred embodiment utilizes a solid glass medium which along with the optics in the sensor is designed such that the amount of transmitted light reaching the output of the medium, that is, the bundle 24, is linearly proportionate to the temperature at the sensor. This means that a linear output reading can be provided without requiring sophisticated electrical circuitry necessary to linearize an otherwise non-linear optical signal. Second, in certain embodiments, the sensor is made sufficiently optically efficient so that the input bundles 20 and 24 can be replaced with individual optical fibers.

Turning to FIG. 2, attention is directed to sensor 14 which is designed in accordance with one embodiment of the present invention. As seen there, the sensor includes a disc-shaped sensing medium 30 which is formed from temperature sensitive, solid glass material to be discussed in more detail hereinafter. For the moment it suffices to say that this material exhibits the thermo-optical properties discussed above. With the exception of its front face 32 all of the surfaces of the disc are internally silvered or otherwise coated for providing internal light reflecting properties. Front face 32 is optically coupled to the free ends of fiber optical bundles 20 and 24 which are contained within a protective sheath 34 constructed of suitable material such as fluorocarbon polymer. This sheath is integrally formed to provide a primary section 34a for containing both fiber optic bundles and two secondary sections 34b and 34c for containing the individual bundles 20 and 24 which, as stated with respect to FIG. 1, extend to light producing means 22 and circuitry 26, respectively. Front face 32 is attached to the adjacent, otherwise free ends of bundles 20 and 24 by any suitable means such as a layer of glass solder 36. The entire solid glass disc 30 is located at the exposed end section of fiber bundles 20 and 24 and contained within a protective sheath which is generally indicated by dotted lins at 38 and which is preferably constructed of ceramic cement.

In an actual working embodiment, each fiber bundle 20 and 24 utilizes galite 2000 C glass fibers manufactured by Galileo Electro-Optics Corporation and there are 210 fibers in each bundle. Bundle 20 is coupled to a Fairchild FLV 161 Red (6650Å) light emitting diode comprising source 22. Bundle 24 is coupled to a United Dectector Technology, Inc. PIN-3DP photo diode forming part of circuitry 26. The otherwise free ends of these bundles are connected to face 32 by means of Corning 7570 lead borosilicate glass solder.

The only component which has not been discussed in detail above is the solid glass media itself. Heretofore, temperature sensitive glass has been used primarily as filters. There has been little if any attempt to use the temperature-dependent optical properties of this material to sense temperature, although its use is suggested generally in the previously recited Saaski patent application and U.S. Pat. No. 3,672,221. However, in a preferred embodiment of the present invention, as will be discussed hereinafter, the solid glass medium 30 is designed to cooperate with light source 22 such that the amount of light which is actually transmitted through the glass medium is substantially linearly dependent upon the temperature at the medium with respect to temperatures within the previously stated wide range, preferably for temperatures between 20° and 200° C.

Obviously, not all glass is temperature sensitive. However, there are a number of different types of glass material which are presently available and which in many cases have been used as filters in the past. These glasses and the theory of operation for their thermo-optical properties are discussed in the above-cited paper entitled An Optical Temperature Sensor For High Voltage Applications. As discussed in that paper, a number of glasses were found that changed significantly in absorption with temperature. The glasses of interest typically displayed "sharp cut" absorption phenomena, in which the transition from opaque to transparent would occur over a narrow band width of perhaps 15 to 40 nm (nanometers). FIG. 3a shows the behavior for a selenium ruby glass operating in a wavelength band of approximately 600 nm to 725 nm at three temperatures, 20° C., 100° C. and 200° C.

The optical properties of the glasses just mentioned are generally considered the result of scattering from crystallized sites within the glass. This nonhomogeneous semi-crystalline state is usually formed during a post production heat treatment of temperatures in excess of 500° C. Typical colorants include sulfur (light yellow), cadmium sulfide (yellow), cadmium selenide (orange-red), gold (rose to ruby), and selenium (ruby). Extensive tabulations of absorption spectrum change with temperature of these glasses are not generally available, and the wavelength shift is instead generally characterized by the temperature dependence of the characteristic wavelength $\lambda_h$, which is defined as the wavelength yielding either 37% or 50% transmission. Table 1 below presents typical values of $d\lambda_h/dT$ for a particular series of gold doped ruby glasses. For a temperature range of 200° C., the 50% absorption wavelength may shift from 32 to 44 nm toward the IR for these glasses. For comparison, the halfpower bandwidths of typical LED emitters range from 20 nm to 50 nm. Therefore, a substantial variation in transmission can be expected as the glass sensor changes temperature if the absorption edge and the diode spectrum are appropriately matched. The optimum relationship for these two parameters was determined empirically as described below.

TABLE 1

50 Percent Transmission Wavelength, $\lambda_h$, and its Dependence on Temperature for Gold-doped Ruby Glass

| Glass Type[a] | $\lambda_h$, nm | $d\lambda_h/dT$, nm/°C. |
|---|---|---|
| RG610 | 602 | 0.16 |
| RG630 | 622 | 0.17 |
| RG645 | 637 | 0.17 |
| RG665 | 657 | 0.17 |
| RG695 | 685 | 0.18 |
| RG715 | 702 | 0.18 |
| RG780 | 760 | 0.22 |
| RG1000 | 918 | 0.19 |

[a] 1 mm thickness

If the spectral output of the emitter (light source) is symmetric with respect to peak power wavelength, $\lambda_p$, and the optical glass has an extremely sharp cutoff, then to maximize signal dynamic range, the cutoff wavelength at the lowest and highest temperatures should be equidistant from $\lambda_p$;

$$\lambda_{o,1} = \lambda_p \pm \tfrac{1}{2} \frac{d\lambda_h}{dT} (T_H - T_L)$$

where $\lambda_{0,1}$ are the wavelength positions of the cutoff at low and high temperature, and $T_H - T_L$ are respectively the high and low temperatures. For a typical $d\lambda_h/dT$ of 0.16 nm/K, and an overall temperatured span of 200° C., the room temperature cutoff should be about 16 nm below the emitter peak power output wavelength.

Eight red sharp cut filters were evaluated for percent transmittance over the temperature range 25°–170° C. using five light emitting diodes with peak wavelengths of 535, 635, 665, 690, and 935 nm. The detector used was a United Detector Technology PIN-3DP Planar diffused silicon photodiode with a peak responsivity of 0.35 A/W at 850 nm.

Photocurrent was measured using a PMI operational amplifier OP-07 in the current mode. Out of the 40 total sets of data, the most promising are plotted in FIG. 3b along with a table of pertinent glass parameters and LED peak wavelengths.

Over the temperature range 25° to 175° C., transmittance of the best samples changed by a factor of 2.5 to 4.0. In general, the optimum combination of emitter and sensor glass occurred when $\lambda_h$ (37%) and the LED peak wavelength were approximately equal. This result is in qualitative agreement with the simple model discussed previously.

As stated above, the most promising filters evaluated have been plotted in FIG. 3b. These filters include Corning red sharp cut filters type 2-64, 2-58, 2-59 and 2-60. A similar table is shown in the above-cited paper but uses a Corning RG 1000 doped ruby glass filter instead of the 2-60 filter. Suitable criteria for making the evaluation as to which filter to use were (1) high percent transmittance change with temperature, (2) temperature linearity (3) radiant power of the light emitting diode, and (4) light pathlength within the glass (i.e. glass thickness). The first criterion just mentioned, that is, high percent transmittant change with temperature, is an appropriate parameter for comparison since the glass filters should display approximately the same transmittance at the mid point temperature. For filters with varied different transmittance, it would be better to use the change in absorption coefficient with temperature ($d\lambda/T$), where $\lambda$ is defined by the Beer-Lambert Law for linear absorption of light in a medium:

$$\frac{dI}{dx} = -\lambda I$$

where I is the light intensity at x (distance within the medium). This first criterion determines the sensitivity of the glass trasmissivity to temperature.

The second criterion, that is, linearity is one particular aspect of the present invention and will be discussed below. The third criterion, that is LED light radiant power multiplied by the first criterion, that is, high percent transmittance change with temperature, gives the actual device sensitivity in terms of change of phototransistor output, i.e. volt/°. The fourth criterion, e.g., the short path length within the glass, minimizes scattering losses within the glass, although in accordance with a second important aspect of the present invention, this dispersion is minimized by optical means, also to be discussed hereinafter.

On the basis of the above criteria, Corning filter CS-2-64 was found to be superior in all of the first three and equal to two of the other filters in the fourth. It had the highest temperature sensitivity and linearity from 25° to 175° C. while paired with the highest LED power. The maximum LED radiant power is not a controlled quantity since this is commercially supplied. However, the available radiant power increases as wavelength increases in commercially produced LEDs and therefore longer wavelength LEDs are more desirable if other factors as satisfied. Paired with the 665 nm LED, the CS-2-64 glass is at its potential peak performance. To get a more sensitive pair, glasses having a transmittance cutoff at even longer wavelengths must be used, where more powerful LEDs are available.

From the foregoing, it should be quite apparent that the type of glass selected, the wavelength band within which it operates and the most suitable LED depends upon many factors including the expected temperature range being monitored. In a preferred embodiment, the temperature range is approximately 20° to 200° C., the wavelength band is between 850 nm and 1000 nm. Obviously, these parameters will change where it is desirable to monitor temperatures within different ranges. However, based on the teachings herein, one could readily select the required parameters.

Attention is now directed to a more detailed discussion of the second mentioned criteriom utilized in selected solid glass medium 30, that is, its linearity. What this actually means is that the actual amount of light which is transmitted entirely through the glass from its input (at the end of fiber optics bund 20) and collected at its output (at the end of fiber optics bundle 24) is linearly proportionate to the temperature at the medium. This linearity is best illustrated in FIG. 3b by the CS-2-64 glass sample. Note that the linearity exists over a wide temperature range, e.g., from about 25° C. to almost 175° C. This linearity is not automatic with the glass selected but depends rather on the overall path length taken by the light transmitted therethrough. More specifically, the degree of linearity depends upon this path length with an optimum length providing maximum linearity. This optimum length depends on the glass selected as well as the light passing therethrough. Once the glass medium is selected along with the light source, the size and shape of the glass and the optics used in directing the light through the glass can be modified to provide an optimum path length for providing maximum linearity. The optimum path length can be determined mathematically (by equations or a computer) or by trial and error. In the case of sensor 30, this is accomplished merely by varying the thickness of its disc shape since the path length is for the most part dependent on this thickness. For other shapes such as the ones to be discussed hereinafter the process is more complicated and relies on more sophisticated mathematics. In either case, this can be readily determined once the glass medium and light source are selected. However, with respect to the determination of the appropriate path length mathematically it is to be understood that the center of the beam is used as the measuring reference. This is because the beam will tend to expand out (like a cone). Nevertheless, by using the beam center, substantial linearity can be achieved.

Having described sensor 14 utilizing solid glass medium 30, the advantages relating to its linear characteristics should be noted. Specifically, as a result of converting the optical signals to electrical signals a linear electrical readout can be provided without requiring sophisticated electric circuitry. This is because the optical output itself is linear, thereby requiring only a direct optical/electrical conversion rather than using circuitry which is necessary to convert a non-linear optical input to a linear electrical output.

Having discussed overall arrangement 10 and particularly sensor 14, attention is now directed to a second sensor 42 which is designed in accordance with a second embodiment of the present invention and which can be used in lieu of the previously described sensor 14. Sensor 42 is shown in FIG. 4 and includes as its primary component sensing medium 44 which has the same temperature dependent light absorption properties as medium 30 and, in fact, is preferably constructed of the same glass material. However, as seen in FIG. 4, medium 44 is formed as a solid hemisphere having a planar front face 46 and a hemispherical back face 48 which is coated at 50 with internal light reflecting material, for example the silvered coating covering most of media 30. In this way, light entering medium 44 from front face 46 is reflected back towards the front face by means of coating 50. In this regard, as will be discussed below, a beam of light within a given wavelength band is directed into medium 48 from a suitable source, for example source 22 in FIG. 1, by means of a single optical fiber 52 rather than the previously described bundle 20. As will also be seen, this light (actually the amount transmitted through the medium depending upon its temperature) expands in a cone-like manner along a relatively straight line path (acting as the center of the cone) to coating 50 and thereafter is reflected back in a light imaging manner to planar surface 46 where it is collected by a single optical fiber 54 rather than bundle 24 for passage to a suitable detector, for example the detection scheme 26 and 28 in FIG. 1. The glass hemisphere 48 and the coupled ends of fibers 52 and 54 are maintained in place by suitable means such as outer casing 56 and inner plug 58.

Referring now to FIG. 5, attention is directed to the specific positional and optical relationships between the glass hemisphere and its coupled optical fibers. At the outset, it should be noted that a hemispherical surface is actually a particular parabolic surface of revolution which defines a parabolic axis of revolution and a focal point on the latter. In FIG. 5, the parabolic axis of rotation is indicated by dotted lines at 60 while therefor the focal point is not specifically shown (f). For a hemisphere, the focal point is located a distance equal to one-half its radius which means that the radius of the glass hemisphere is twice the focal distance of the hemispherical surface 50 from an optical standpoint or $2f$ as indicated in FIG. 5. In the embodiment shown, the light directing and light collecting ends of fibers 52 and 54 are symmetrically positioned on either side of parabolic axis 60 against planar surface 46, e.g., equal distances from surface 50.

It can be seen from FIG. 5 that fiber 52 directs an expanding beam of light B1 from a first point or location 1 at planar surface 46 to a second point or location 2 at hemispherical surface 50 along a path (the center of the expanding beam) which is substantially parallel to and adjacent axis 60 through medium 48. The rate of expansion depends in part on the diameter of fiber 58 and the index of refraction n of medium 44. In an actual embodiment, n equals 1.53 for medium 44. Because of the parabolic and symmetrical nature of reflecting surface 50, this light is imaged to a third point or location 3 after first converging and thereafter diverging as indicated at B2. Note that the width of the imaged beam at point 3 is actually about the same width as the originating beam at point 1 and symmetrically located on the opposite side of axis 60. This is because point 3 and point 1 are symmetrically located on opposite sides of axis 60 equal distances from point (surface) 2. In the embodiment shown, the distance from points 1 and 3 to point 2 is approximately twice the focal length or $2f$ which actually means in optical terms that the parabolic nature of reflecting surface 50 optically couples fiber 54 with fiber 52 so as to provide an optical magnification of one.

By providing the optical control just described, it is possible to use two single optical fibers rather than the bundles described with respect to FIGS. 1 and 2. Moreover, this optical arrangement reduces losses due to dispersion. While the hemisphere is a convenient shape for providing the optics just described, it is to be understood that to provide the same optical arrangement, medium 48 could be provided with other configurations. In these cases the optimum distance $2f$ (twice the focal length) would be determined by ray tracing or calculation using mathematical descriptions of the reflecting surfaces. Moreover, these aspheric but otherwise symmetrical light reflecting configurations (including parabolic and non-parabolic configuration) could be more efficient than the hemisphere used. In this latter case, to provide optical coupling with a magnification of one, the previous points 1 and 3 must be symmetrically located on opposite sides of the configuration's axis of revolution relative to point (surface) 2 as above. In this way the light from point 2 is imaged (in reverse) to point 3 with a magnification of one. In this regard it should be noted that the magnification ratio can be increased or decreased by moving point 1 and 3 parallel to the axis of revolution.

Having described sensor 42, attention is now directed to sensor 62 which follows many of the optical principles of sensor 42 but which is designed in accordance with still another embodiment of the present invention. As shown in FIG. 6, sensor 62 includes a solid glass sensing medium 64 which may be identical in function to sensing medium 48 but which is formed in the shape of a disc having a thickness T. This disc shaped sensing medium includes a front face 66, a back face 68 and internally reflecting coating 70 on its back face. As seen in FIG. 6, the disc shaped medium 64 is located at the forwardmost end of and within a longitudinally extending chamber 72 defined by an overall longitudinally extending housing 74. This housing is constructed from a cylinder 74a and two end caps 74b and 74c constructed of suitable material, preferably opaque plastic material or the like and assembled together by adhesive or other suitable means. The two single fibers 52 and 54 associated with sensor 42 and discussed above with respect to FIG. 4 extend through end 74c in the embodiment of FIG. 6 and terminate a predetermined distance in front disc shaped medium 64. Finally, a light refracting lens 76 in the shape of a hemisphere comprises part of the overall sensor 62 and includes a hemispherical surface 78 and a planar surface 80. The lens has a known index of refraction, preferably a relatively high index of refraction and in an actual working embodiment an index refraction equal to 1.74. In the preferred embodiment, the glass medium 64 has the same index of refraction. As seen in FIG. 6, its planar surface is located against the front surface 66 of sensing medium 64 while the hemispherical face confronts the adjacent ends of fibers 52 and 54. The space between fibers 52 and 54 and lens 76 within chamber 72 is perferably filled with air or a vacuum having an index refraction of 1.00.

From an optical standpoint, the hemispheric lens 76 functions as a focusing element. More specifically, as shown in FIG. 7, the lens includes a symmetrical axis of rotation 82 and a focal point located on the axis.

From an optical standpoint, the positional relationship of the light directing and light collecting ends of optical fibers 52 and 54 and the lens 76 is the same as that described with respect to sensor 42. More specifically, the last-mentioned ends of fibers 52 and 54 are symmetrically located on opposite sides of axis 80 equal distances from lens 76. As seen in FIG. 6, the light beam leaves axis 82 from a first point 1' and eventually reaches light reflecting surface 70 after passing through the light refracting lens and sensing medium where it is reflected to a second point 2', again through lens 76 and medium 64. The light transmitted through the lens (both times) and reaching point 2 is imaged by the lens to a third point 3' at the entry of light collecting fiber 54.

As stated previously, the optics just described operates on the same principles discussed with respect to the optics illustrated in FIG. 5. This means that points 1' and 3' are symmetrical about axis 82 and equal distances from point (surface) 2, thereby providing an image magnification of one. In the particular embodiment shown in FIG. 6, the distance between points 1', 3' and point 2 is approximately two focal lengths from lens 76. This distance $2f$ can be derived by the following formula:

$$2f = \frac{Rn2}{n1 - n2}$$

where R is the radius of the hemispherical lens 76, n1 is its index of refraction and n2 is the index of refraction of the space between the lens and optical fibers which is one in the case of air or vacuum. Obviously, where the lens 76 is not hemispherical, this equation will be different, but nevertheless readily derived.

Each of the last two sensors just described has the distinct advantage of efficiently coupling light from an entry point to a collection point making it possible to use single fibers to this end. In addition, each of the light sensing medium comprising these sensors can be designed to provide a unique optical path length therethrough so as to provide the linearity described with respect to sensor 30. Thus, there is an optimum radius for media 48 and optimum thickness for medium 64 in order to provide maximum linearity.

In order to more fully understand the general way of optimizing linearity, reference is again made to the previously recited paper where it is pointed out that overall system response is given to first order by the integral relation $$I_d - I_{dc} = T_r \cdot T_{ea} \cdot T_{da} \cdot T_{sa} \int_{\lambda_0}^{\lambda_1} E_\lambda \cdot T_{F\lambda} \cdot T_{s\lambda} \cdot T_{r\lambda} \cdot T_{d\lambda} \cdot d\lambda$$

where $I_d$ is total photodetector current, $I_{dc}$ is the detector dark current, $T_r$ is the transmission factor related to surface reflection losses, $T_{ea}$ is the transmission factor related to the emitter angular emission pattern and the fiber bundle size and numerical aperture, and $T_{da}$ and $T_{sa}$ are corresponding geometric/optical transmission factors for the photodector and sensor, respectively.

These factors are considered wavelength independent. The photodetector current is dependent on the following spectral functions: the emitter output, $E_\lambda$; the transmittance of the fiber optic core material, $T_{f\lambda}$; the transmittance of the sensor glass, $T_{s\lambda}$; and the power sensitivity of the detector, $T_{d\lambda}$; and the power sensitivity of the detector, $T_{d\lambda}$. When these functions are integrated as in equation (3) over the output spectrum $\lambda_0$ to $\lambda_1$ of the emitter, the system response is approximated.

To achieve the desired linearization, values of $I = I_d - I_{dc}$ are calculated from the equation just recited using a 10° C. temperature increment or other standard increments. This set of temperature dependent photocurrents are then approximated to a straight line by minimizing the summation which equals:

$$\sum_{i=1}^{h} [I_i - (A + BT)]^2$$

This "least squares" parameterization is performed for a range of light path lengths. When the least squares sums given above are plotted vs. the light path length, the curve will typically display a relative minimum at a specific path length. This path length is then selected as the appropriate total path length through the sensing medium for a light ray eminating perpendicular to the face of the input fiber and from the center of the fiber.

It is claimed:

1. An arrangement for sensing temperature changes within a desired range at an object, said arrangement comprising:
 (a) means for producing light within a given wavelength bands;
 (b) a sensor including a temperature sensing medium which, with respect to the light within said given wavelength band, changes in optical density with changes in temperature within said range for changing the amount of said light which is transmitted therethrough;
 (c) means cooperating with said light producing means for directing an outwardly expanding beam of said light from a first location to a second location along a first path at least a segment of which passes through said medium whereby the amount of light in said beam which is transmitted to said second location depends upon the temperature at said medium;
 (d) means located at said second location for imaging the transmitted light reaching said second location along a second path to a third location, said imaging including a symmetrical light reflecting surface defined by a specific optical axis of rotation and a focal point on said axis a fixed focal distance out from said surface, said first path being a straight line path to one side of but in close proximity to and substantially parallel with said optical axis whereby said light reflecting surface images said transmitted light along said second path and wherein said second path is approximately twice said fixed focal distance in length; and
 (e) means for detecting the transmitted light imaged to said third location, whereby to indicate the temperature at said object.

2. An arrangement according to claim 1 wherein said sensing medium is in the shape of a hemisphere defining a planar surface and hemispherical surface and wherein said light reflecting surface is located directly against and conforms to the shape of said hemispherical surface, whereby said first and third locations are located on said planar surface.

3. An arrangement for sensing temperature changes within a desired range at an object, said arrangement comprising:
 (a) means for producing light within a given wavelength band;
 (b) a sensor including a temperature sensing medium which, with respect to the light within said given wavelength band, changes in optical density with changes in temperature within said range for changing the amount of said light which is transmitted therethrough, said medium being disc-shaped and having a front planar face and a parallel back planar face;
 (c) means cooperating with said light producing means for directing an outwardly expanding beam of said light from a first location to a second location along a first path at least a segment of which passes through said medium whereby the amount of light in said beam which is transmitted to said second location depends upon the temperature at said medium, said directing means including a light reflecting surface coating on the back face of said disc-shaped medium;
 (d) means located at said second location for imaging the transmitted light reaching said second location along a second path to a third location, said imaging means including a light refracting lens having a front light refracting face defining an axis and a focal point on said axis a fixed distance from said light reflecting surface and a planar back face positioned against the front face of said medium, said first path including a first segment extending from said first location to an intermediate point at the front face of said lens parallel with and to one side of but in close proximity to said axis, a second segment extending from said intermediate point to said light reflecting surface and a third segment extending from said light reflecting surface to said second location at the front light refracting face of said lens, and wherein said third location is located on the side of said axis opposite said first path segment but equidistance from said axis and approximately twice said focal distance from said light refracting front face; and
 (e) means for detecting the transmitted light imaged to said third location, whereby to indicate the temperature at said object.

4. An arrangement according to claim 3 wherein said lens is in the shape of a hemisphere.

5. An arrangement for sensing temperature changes at an object within a temperature range of from about 25° C. to about 175° C., said arrangement comprising:
 (a) means for producing light within a wavelength band of from about 600 nm to about 1000 nm;
 (b) a sensing including a temperature sensing glass medium of predetermined size and shape which, with respect to the light within said given wavelength band, changes in optical density with changes in temperature within said range for changing the amount of said light which is transmitted therethrough;
 (c) means cooperating with said light producing means for directing an outwardly expanding beam of said light from a first location to a second location along a first path at least a segment of which passes through said medium whereby the amount of light in said beam which is transmitted to said second location depends upon the temperature at said medium;

(d) means located at said second location for imaging the transmitted light reaching said second location along a second path to a third location, said imaging means including a symmetrical light reflecting surface defined by a specific optical axis of rotation and a focal point on said axis a fixed focal distance out from said surface, said first path being a straight line path to one side of but in close proximity to and substantially parallel with said optical axis whereby said light reflecting surface images said transmitted light along said second path and wherein said second path is approximately twice said fixed focal distance in length;

(e) said glass medium being of a predetermined size and shape and the path through said medium by said transmitted light being such that the amount of transmitted light reaching said third location is linearly dependent upon the temperature of said medium with respect to temperatures within said range; and (f) means for detecting the transmitted light imaged to said third location, whereby to indicate the temperature at said object.

6. An arrangement according to claim 5 wherein said light directing means includes a single optical fiber optically coupled with said light producing means and having a free end located at said first location, said sensor including a single optical fiber coupled with said detecting means and having a free end located at said third location.

7. An arrangement according to claim 5 wherein said sensing medium is in the shape of a hemisphere defining a planar surface and hemispherical surface and wherein said light reflecting surface is located directedly against and conforms to the shape of said hemispherical surface, whereby said first and third locations are located on said planar surface.

8. An arrangement for sensing temperature changes at an object within a temperature range of from about 25° C. to about 175° C., said arrangement comprising:

(a) means for producing light within a wavelength band of from about 600 nm to about 1000 nm;

(b) a sensor including a temperature sensing glass medium of predetermined size and shape which, with respect to the light within said given wavelength band, changes in optical density with changes in temperature within said range for changing the amount of said light which is transmitted therethrough, said medium being disc-shaped and having a front planar face and a parallel back planar face;

(c) means cooperating with said light producing means for directing an outwardly expanding beam of said light from a first location to a second location along a first path at least a segment of which passes through said medium whereby the amount of light in said beam which is transmitted to said second location depends upon the temperature at said medium, said directing means including a light reflecting surface coating on the back face of said disc-shaped medium;

(d) means located at said second location for imaging the transmitted light reaching said second location along a second path to a third location, said imaging means including a light refracting lens having a front light refracting face defining an axis and a focal point on said axis a fixed distance from said light reflecting surface and a planar back face positioned against the front face of said medium, said first path including a first segment extending from said first location to an intermediate point at the front face of said lens parallel with and to one side of but in close proximity to said axis, a second segment extending from said intermediate point to said light reflecting surface and a third segment extending from said light reflecting surface to said second location at the front light refracting face of said lens, and wherein said third location is located on the side of said axis opposite said first path segment but equidistance from said axis and approximately twice said focal distance from said light refracting front face;

(e) said glass medium being of a predetermined size and shape and the path through said medium by said transmitted light being such that the amount of transmitted light reaching said third location is linearly dependent upon the temperature of said medium with respect to temperatures within said range; and (f) means for detecting the transmitted light imaged to said third location, whereby to indicate the temperature at said object.

9. An arrangement according to claim 8 wherein said lens is in the shape of a hemisphere.

* * * * *